(12) United States Patent
Ishizuka (10) Patent No.: US 7,054,095 B2
(45) Date of Patent: May 30, 2006

(54) DISPLACEMENT DETECTION APPARATUS, AND MAGNETIC RECORDING APPARATUS AND ENCODER USING THE DISPLACEMENT DETECTION APPARATUS

(75) Inventor: Ko Ishizuka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 09/840,116

(22) Filed: Apr. 24, 2001

(65) Prior Publication Data

US 2002/0021523 A1 Feb. 21, 2002

(30) Foreign Application Priority Data

Apr. 28, 2000 (JP) .................................. 2000-130754

(51) Int. Cl.
*G11B 5/596* (2006.01)

(52) U.S. Cl. ...................... 360/77.03; 360/75
(58) Field of Classification Search ........... 360/77.03, 360/75; 369/53.28, 44.23, 44.42; 356/479, 356/373

See application file for complete search history.

(56) References Cited

U.S. PATENT DOCUMENTS

| | | | | |
|---|---|---|---|---|
| 5,067,813 A | | 11/1991 | Ishizuka et al. ............. 356/351 |
| 5,534,693 A | | 7/1996 | Kondo et al. ................ 250/237 |
| 5,568,337 A | | 10/1996 | Eguchi et al. ............ 360/78.11 |
| 5,774,218 A | * | 6/1998 | Takamiya et al. ............ 356/486 |
| 5,774,295 A | * | 6/1998 | Tsai ........................ 360/77.03 |
| 5,909,333 A | * | 6/1999 | Best et al. ..................... 360/51 |
| 5,930,066 A | | 7/1999 | Ishizuka et al. .......... 360/77.03 |
| 5,982,494 A | * | 11/1999 | Hercher ...................... 356/620 |
| 5,991,112 A | * | 11/1999 | Song et al. .................... 360/75 |
| 6,307,702 B1 | * | 10/2001 | Fukushi et al. ............... 360/75 |
| 6,583,948 B1 | * | 6/2003 | Taniguchi .................... 360/75 |

* cited by examiner

*Primary Examiner*—K. Wong
(74) *Attorney, Agent, or Firm*—Fitzpatrick, Cella, Harper & Scinto (57) ABSTRACT

To detect the position of an object in a non-contact state at high reliability, high accuracy, and high resolving power, a linearly polarized light beam from a semiconductor laser source is converted into an almost parallel light beam by a collimator lens, transmitted through a non-polarization beam splitter, focused by an objective lens, and transmitted through a crystal plate. When an appropriate thickness t is given to the crystal plate, the principal rays of polarized light beams o and e emerge while being shifted by a predetermined amount and are focused into a spot or line having a width w near a slit-shaped marking (M) formed on a head arm, whereby portions shifted from each other are illuminated. The two reflected light beams pass back through the crystal plate. The principal rays of the two light beams match again and are returned to the non-polarization beam splitter, and split into transmitted light and reflected light. The reflected light is split by a polarizing prism in accordance with the polarization planes of ordinary light beam (o) and extraordinary light beam (e). These light beams become incident on light receiving elements. A displacement of the marking (M) is detected on the basis of changes in signal levels of two signals output from the light receiving elements.

26 Claims, 10 Drawing Sheets

DISPLACEMENT DETECTION APPARATUS, AND MAGNETIC RECORDING APPARATUS AND ENCODER USING THE DISPLACEMENT DETECTION APPARATUS

BACKGROUND OF THE INVENTION

1. Field of the Invention

The present invention relates to a displacement detection apparatus for optically detecting a small movement of an object in an industrial manufacturing apparatus or the like in a non-contact state, and a magnetic recording apparatus as an industrial product manufacturing apparatus using the displacement detection apparatus.

2. Related Background Art

For example, in the process of magnetically recording a servo pattern on the surface of a disk in a hard disk device (HDD) used in a computer, the position of the magnetic head must be sequentially shifted by a predetermined amount.

The positioning resolving power requires an accuracy in the order of several nm, consonant with the increase in density of an HDD. To realize such positioning in the order of several nm, a resolving power and stability greater than those of a laser interferometric measuring machine are required. In recent years, a grating interference rotary encoder has been used.

Figure 1:
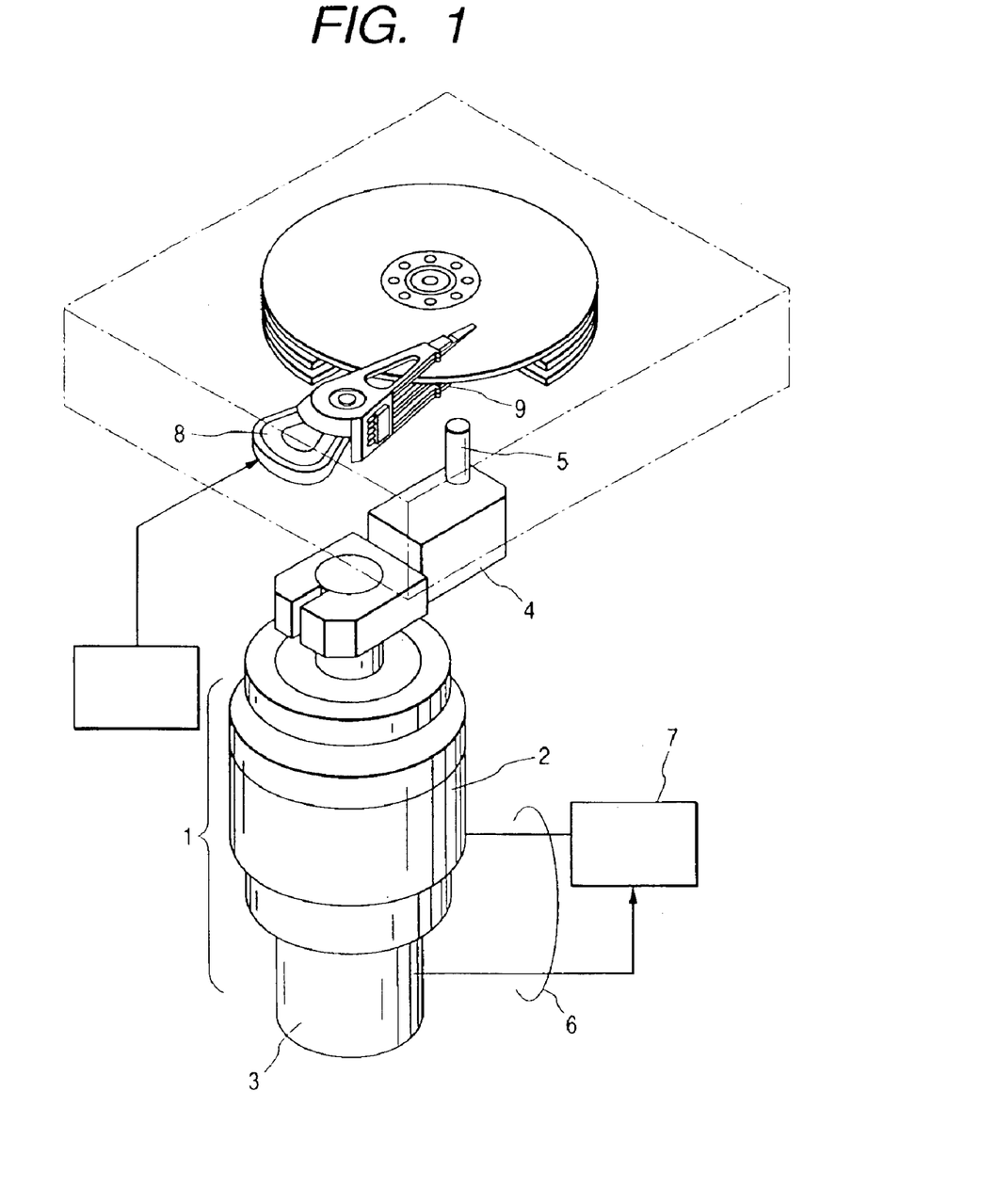
FIG. 1 is a perspective view showing the arrangement of a conventional positioning apparatus for servo track pattern writing.

FIG. 1 is a schematic view of a conventional positioning apparatus for servo track signal writing.

A rotary positioner 1 is constructed by a positioning control motor 2, a rotary encoder 3 attached to the motor 2 to detect the rotation amount of the rotating shaft, an arm 4, and a pushrod 5 projecting from the distal end portion of the arm 4.

The rotary positioner 1 is connected to a computer 7 through a control system 6.

In operation, while rotating and sequentially feeding the arm 4 in a small amount to position it by the rotary positioner 1, a small current is supplied to a voice coil motor 8 to move a head arm 9 and bring it into contact with the pushrod 5.

Hence, the movement of the head arm 9 matches that of the pushrod 5. When vibration by rotation of the hard disk is transmitted to the head arm 9 and then to the motor 2 through the cylindrical surface of the pushrod 5, highly accurate positioning by the rotary positioner system is impeded so as to deteriorate the writing performance for information, such as servo track signals at a high density.

Various kinds of methods using an optical sensor for optically detecting the head arm 9 itself in a non-contact state at an nm-order resolving power stability have also been examined.

However, since these methods require an expensive diffraction grating on the head arm 9 or special working, a demand has arisen for a more inexpensive and effective method.

SUMMARY OF THE INVENTION

It is an object of the present invention to provide a displacement detection apparatus for detecting a movement of the head arm 9 in a non-contact state, which is implemented without arranging any large-scale member on the head arm side.

Especially, it is an object of the present invention to provide a compact and lightweight displacement detection apparatus which allows position detection and positioning of a head arm at high reliability, high accuracy, and high resolving power using a non-contact optical means, and a magnetic recording apparatus and encoder using the displacement detection apparatus.

DETAILED DESCRIPTION OF THE EMBODIMENTS

The present invention will be described in detail on the basis of the embodiments shown in FIGS. 2 to 16.

Figure 2:
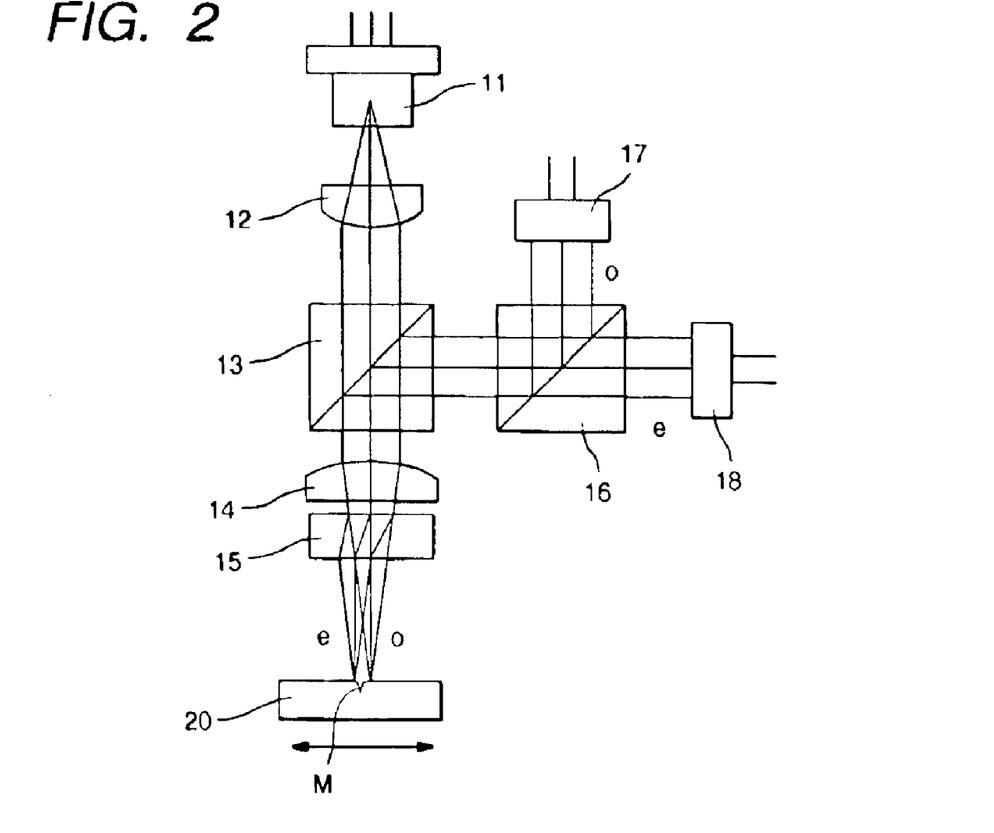
FIG. 2 is a view showing the arrangement of an embodiment.

FIG. 2 is a view showing the arrangement of an optical displacement detection apparatus according to an embodiment. A collimator lens 12, a non-polarization beam splitter 13, an objective lens 14, and a crystal plate 15 are arranged in the emission direction of a light beam from a semiconductor laser source 11. A polarizing prism 16 is arranged in the reflection direction of the non-polarization beam splitter 13. A light receiving element 17 is arranged in the reflection direction of the polarizing prism 16, and a light receiving element 18 is arranged in the transmission direction of the polarizing prism 16.

A head arm 20, the movement of which is to be measured, is arranged under the crystal plate 15.

A linearly polarized light beam from the semiconductor laser source 11 is converted into an almost parallel light beam by the collimator lens 12, transmitted through the non-polarization beam splitter 13, focused by the objective lens 14, and transmitted through the crystal plate 15.

Figure 3:
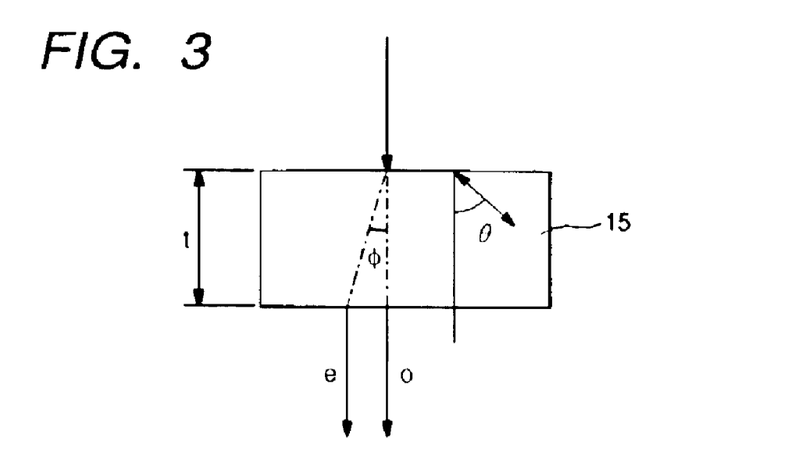
FIG. 3 is an explanatory view of a shift between two polarized light beams by crystal parallel plate.

As shown in FIG. 3, the crystal plate 15 has a thickness t. The crystal plate 15 is defined as a parallel plate whose normal line of a boundary surface makes an angle θ with respect to the optical axis. For incident light whose wave vector is parallel to the drawing surface, the drawing surface is the major section. Both the wave vector and ray vector of refracted light are parallel to the drawing surface.

For a plane wave that vertically becomes incident, the wavefront is not refracted, and the wave vector does not change its direction for both an ordinary wave o and an extraordinary wave e. For the ray vector, the ordinary wave (o) does not change its direction, though the extraordinary wave (e) propagates in a direction shifted by φ, as is represented by $$\tan \phi = \{(no2-ne2)\sin \theta \cdot \cos \theta\}/\{ne2 \cdot \cos 2\theta + no2 \cdot \sin 2\theta\}$$

Figure 4:
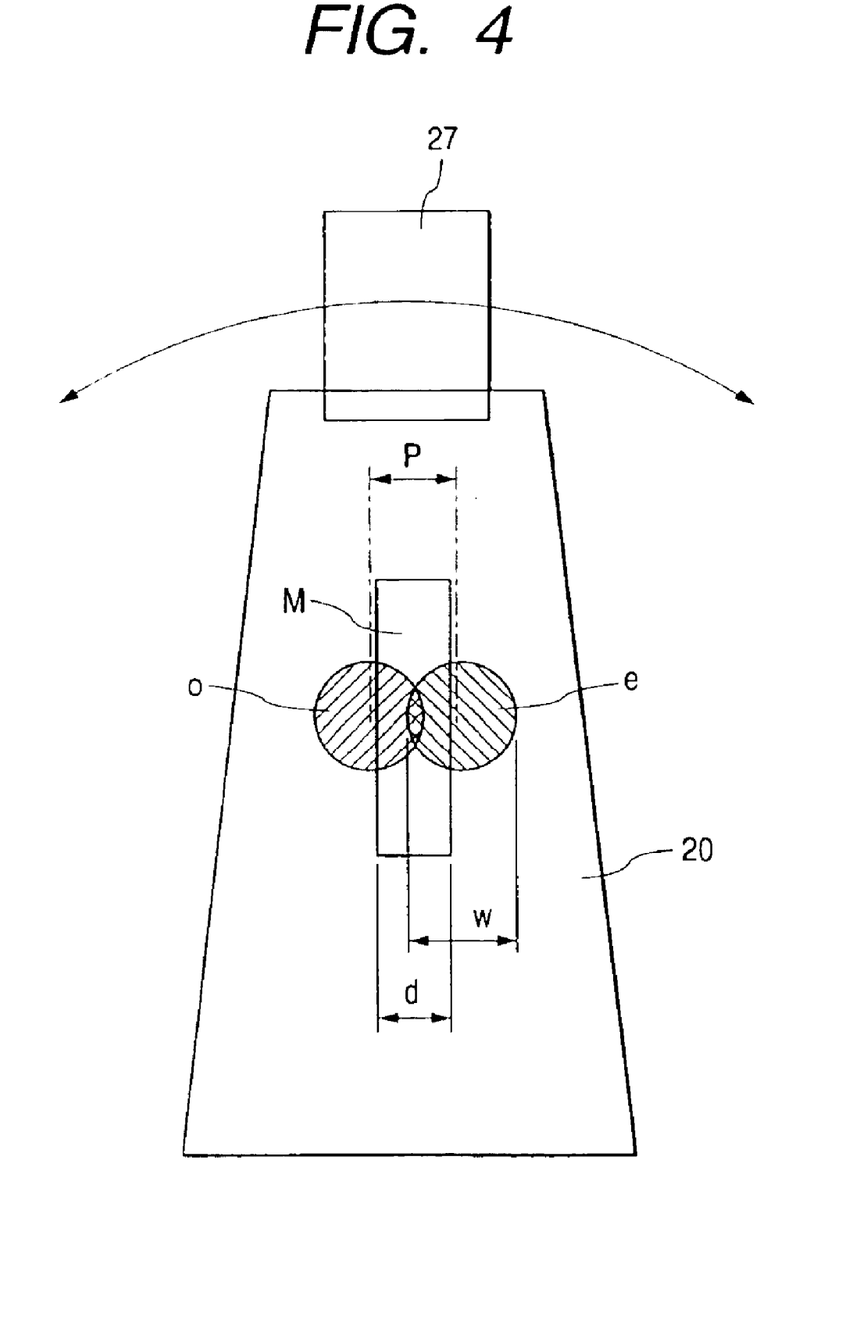
FIG. 4 is an explanatory view of an illumination light beam by an optical displacement detection apparatus.

The two polarized light beams o and e become parallel when they emerge from the crystal plate 15. As shown in FIG. 4, a lateral shift amount d is given by $$d = \tan \phi \cdot t$$

Hence, when the crystal plate 15 has an appropriate thickness t, the principal rays of the polarized light beams o and e emerge while being shifted by a predetermined amount. The two light beams emerging are linearly polarized waves whose planes of polarization are perpendicular to each other. With the focusing function of the objective lens 14, the linearly polarized light beams that are perpendicular to each other are focused into spots each having a focus diameter w or lines each having the focus width w near a slit-shaped marking M, which is formed on the head arm 20, at positions spatially separated from each other, as shown in FIG. 2.

FIG. 4 is an explanatory view of the portion of the marking M illuminated with the light. When the slit-shaped marking M formed on the head arm 20 passes through the region where the two polarized light beams o and e are focused, the reflected light amounts are modulated at different timings.

Referring to FIG. 2, the two reflected light beams from the region where the slit-shaped marking M passes through pass through the crystal plate 15. The principal rays of the two light beams match again and are returned to the non-polarization beam splitter 13.

The light beams are split into transmitted light and reflected light by the non-polarization beam splitter 13. In this embodiment, only the reflected light is used.

Although the principal rays of the two reflected polarized light beams match, the planes of polarization are kept unchanged. Hence, the light reflected by the non-polarization beam splitter 13 is guided to the polarizing prism 16, and split in accordance with the planes of polarization of the ordinary light beam (o) and extraordinary light beam (e). The split light beams become incident on the light receiving elements 17 and 18, respectively.

Figure 5:
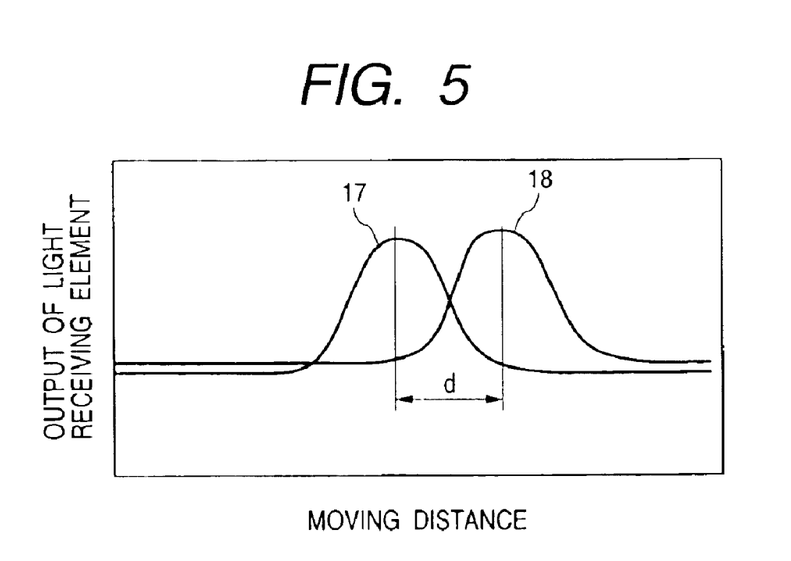
FIG. 5 is a graph for explaining the output signal waveforms of the optical displacement detection apparatus.

FIG. 5 is a graph showing changes in reflected light amounts, i.e., incident light amounts onto the light receiving elements 17 and 18 when the slit-shaped marking M relatively moves through the two focusing regions. An optimum resolving power is obtained when each focusing width (for spot focusing, focusing diameter) w almost equals the slit width d, and a displacement P between the two focused light beams almost equals the slit width d.

Figure 6:
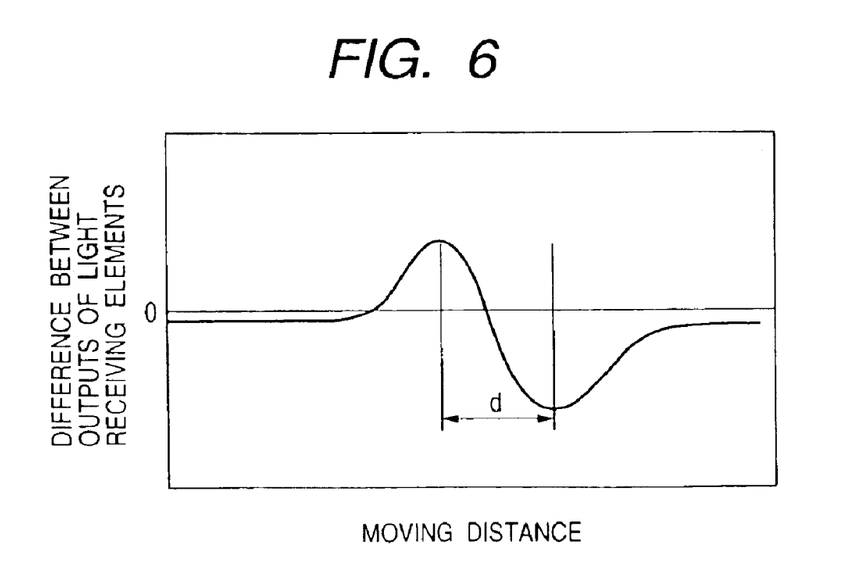
FIG. 6 is a graph for explaining a difference signal obtained from the output signal waveforms of the optical displacement detection apparatus.

The displacement is detected on the basis of changes in signal levels of the two signals. More preferably, the difference signal between the two signals is detected, and a predetermined level Vf near the zero-cross point is defined as a reference position, as shown in FIG. 6. When the slit-shaped marking M relatively shifts to the left or right, the signal level rises or drops. When the slit-shaped marking M moves by the width d, the signal level changes from the maximum value to the minimum value. For example, when the marking width d is set at 5 μm, and the signal level is divided into 4,096 steps using an A/D converter, a resolving power of about 1.25 nm can be obtained. When not the whole signal level but only the signal level of 1.0% near the zero-cross point is divided into 4,096 steps by the A/D converter, a resolving power about 10 times higher (0.125 nm) can be obtained.

In the above embodiment, a slit-shaped marking is used. However, even when a pattern formed by some printing or photo process, or a mere scribe line is used, different reflected states can be obtained, and the same effect as described above can be obtained.

Figure 7:
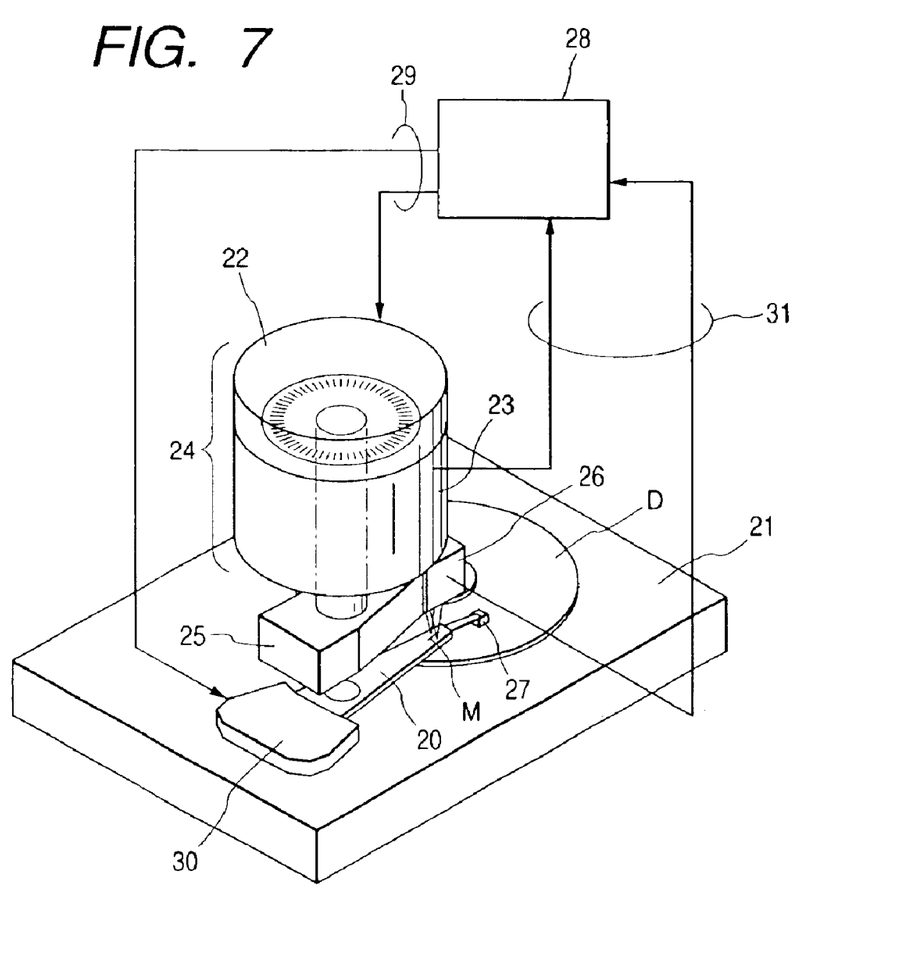
FIG. 7 is a view showing the arrangement of a hard disk drive servo track pattern writing apparatus using the optical displacement detection apparatus.

FIG. 7 is a view showing an embodiment in which the optical displacement detection apparatus of the above embodiment is applied to a servo pattern recording apparatus for an HDD. A rotary positioner 24 formed from an encoder 22 and a motor 23 is arranged above an HDD housing 21. An optical displacement detection apparatus 26 according to the above embodiment is attached to the distal end of a rotary arm 25. The center of the rotating shaft of the rotary positioner 24 preferably matches the central axis of rotation of a head arm 20 in the housing 21.

A head 27 is attached to the distal end of the head arm 20.

The detection apparatus 26 of this embodiment has an outer size of about 20 mm and is very compact. The apparatus does not adversely affect rotary positioning control of the rotary positioner 24 by a computer 28 and a control system 29. The signal from the detection apparatus 26 is input to an A/D converter in the computer 28 through a junction circuit. In the computer 28, the numerical value of the A/D converter is monitored. If a displacement is detected, a rotation instruction is issued to an HDD voice coil motor 30 connected therewith. A control system 31 is formed for the purpose of canceling the generated displacement.

That is, control is performed such that the detection apparatus 26 arranged on the rotary positioner 24 and the slit-shaped marking M by the head arm 20 hold a predetermined positional relationship.

The process of writing a servo track signal on the hard disk of the HDD will be described.

(1) The rotary positioner 24 is rotated and scanned by the control system 29, and the optical displacement detection apparatus 26 detects a position where the displacement signal has a predetermined value above the slit-shaped marking M on the head arm 20 in the housing 21, and fixes the positional relationship under the control.

(2) The rotary positioner 24 is rotated to a predetermined position by the control system 29, and a signal is supplied to the HDD head 27 to record a servo track signal.

The head arm 20 in the housing 21 is made to follow up the rotation of the rotary positioner 24 by the control system 31.

(3) The predetermined position of the rotary positioner 24 is updated, and servo track signals are sequentially recorded on a hard disk D.

With this arrangement, servo track signals at a high density can be recorded on the hard disk D. The following modifications can be made on the basis of the above embodiment.

(i) The non-polarization beam splitter 13 for guiding an illumination light beam from the light source 11 to the measurement surface and guiding reflected light beams from the measurement surface to the light receiving elements 17 and 18 can be changed to a diffraction grating having an equivalent function.

In addition, the optical path of the illumination light beam and that of the reflected light beam are spatially separated by generating a difference between the incident angle of the illumination light beam to the measurement surface, i.e., the head arm 20 and the exit angle of the reflected light beam, and one of the light beams may be split using not the non-polarization beam splitter 13 but a small mirror.

(ii) Although the collimator lens 12 and objective lens 14 are used above to focus the light and illuminate the measurement object with the light, the two elements may be integrated. The light may be focused not into a spot but into a line extending along the direction of the slit-shaped marking M.

In this case, the objective lens 14 need be formed from not a spherical lens but a cylindrical lens.

With this arrangement, a flaw is hardly erroneously detected as the slit-shaped marking or scribe line, and more stable detection can be performed.

Figure 8:
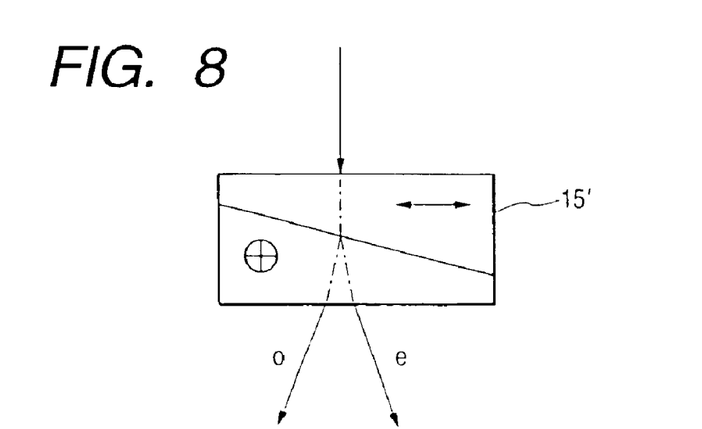
FIG. 8 is an explanatory view of a shift between two polarized light beams by a 2-beam Wollaston prism.

(iii) A single crystal plate 15 is used above as a crystal optical element. However, it may be changed to another polarizing element having an equivalent function, e.g., a 2-beam Wollaston prism 15' shown in FIG. 8.

Figure 9:
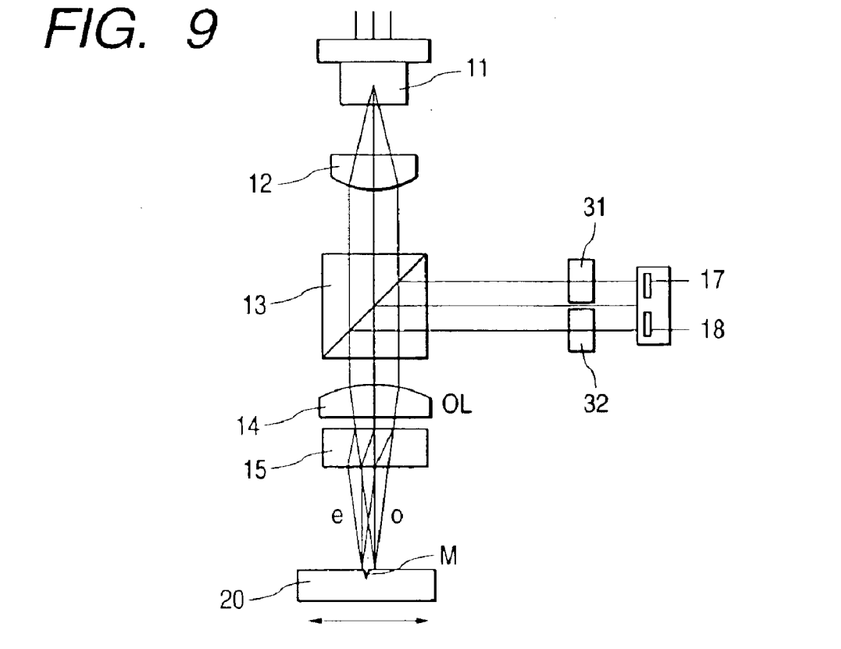
FIG. 9 is a view showing an application example of a linear encoder to an origin detection optical system.

(iv) In the above embodiment, the reflected light beam from the two illumination light beams is split by the polarizing prism 16, and the respective light beam components are sent to separate light receiving elements 17 and 18. However, as shown in FIG. 9, instead of separating the light receiving elements 17 and 18, they may be formed into a 2-division photodiode to directly receive the light beams. In this case, when polarizing plates 31 and 32 are inserted immediately before the light receiving elements 17 and 18, the signals of the respective polarized light components can be detected, and the optical system can be very simple and easily assembled.

Figure 10:
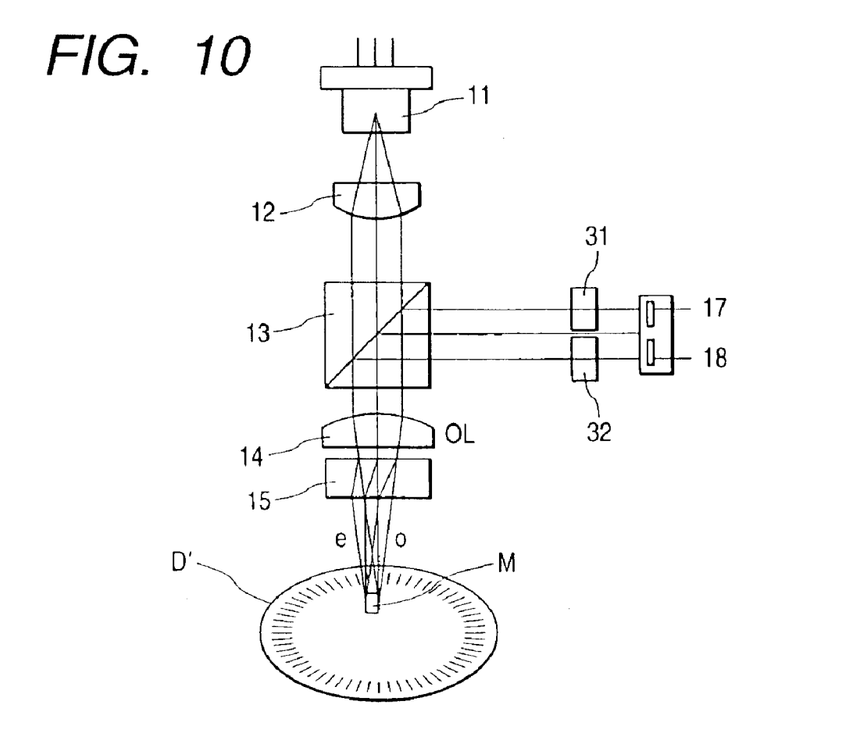
FIG. 10 is a view showing an application example of a linear encoder to an origin detection optical system.

(v) In the above embodiment, the displacement detection apparatus is applied to an HDD servo pattern recording apparatus. The displacement detection apparatus can also be applied to the origin detection optical system of an optical encoder. For example, as shown in FIG. 10, the slit-shaped marking M is formed on the rotary encoder disk D', portions that are spatially shifted are illuminated with two light beams, and the reflected light beams are received.

For example, a portion where the difference signal between the light receiving signals becomes zero is defined as the origin of the encoder.

In the embodiment, to linearly illuminate the object in accordance with the slit-shaped marking M, a cylindrical lens is used as the objective lens 14.

Figure 11:
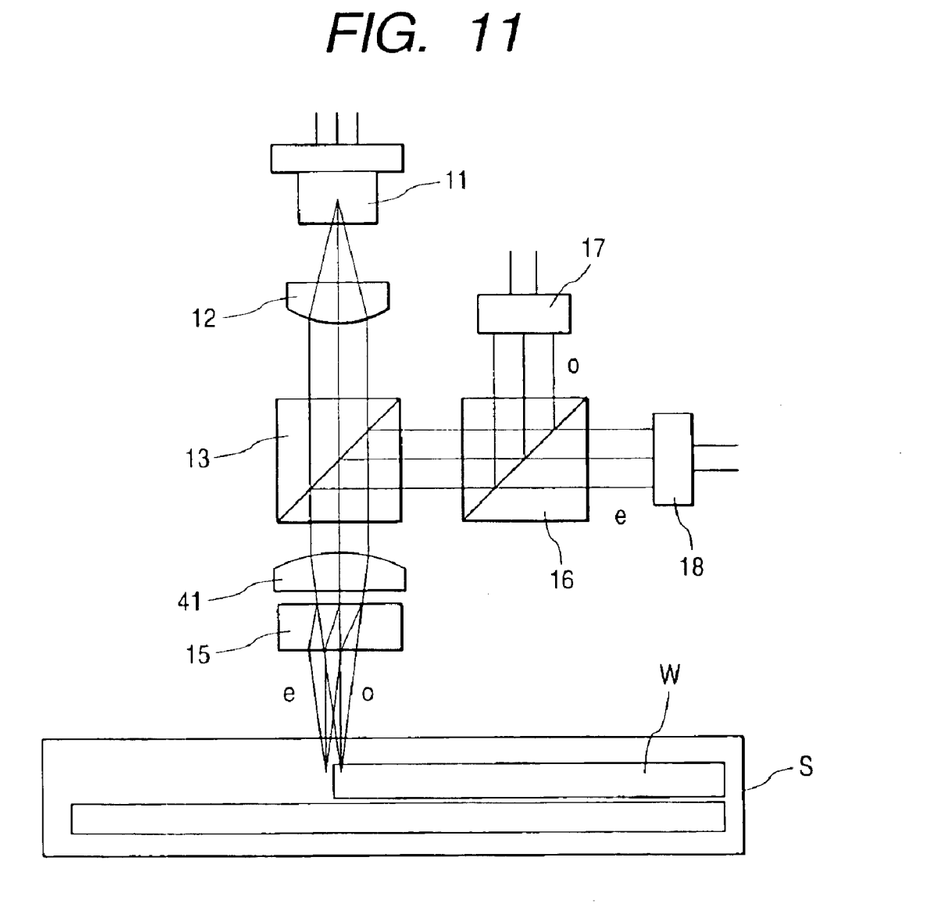
FIG. 11 is a view showing the arrangement of an optical displacement detection apparatus according to another embodiment when a level difference is generated between light receiving elements.

FIG. 11 is a view showing the arrangement of another embodiment for detecting the origin of a linear encoder. A linear encoder scale S is partially coated with a non-reflecting object W to give a boundary portion, i.e., level difference, portions that are spatially shifted are illuminated with two light beams, and reflected light beams are received.

In this embodiment, since the illumination light is focused into a linear shape extending along the boundary portion, a cylindrical lens 41 is used as an objective lens 14 to prevent the influence of a small defect and the like.

Figure 12:
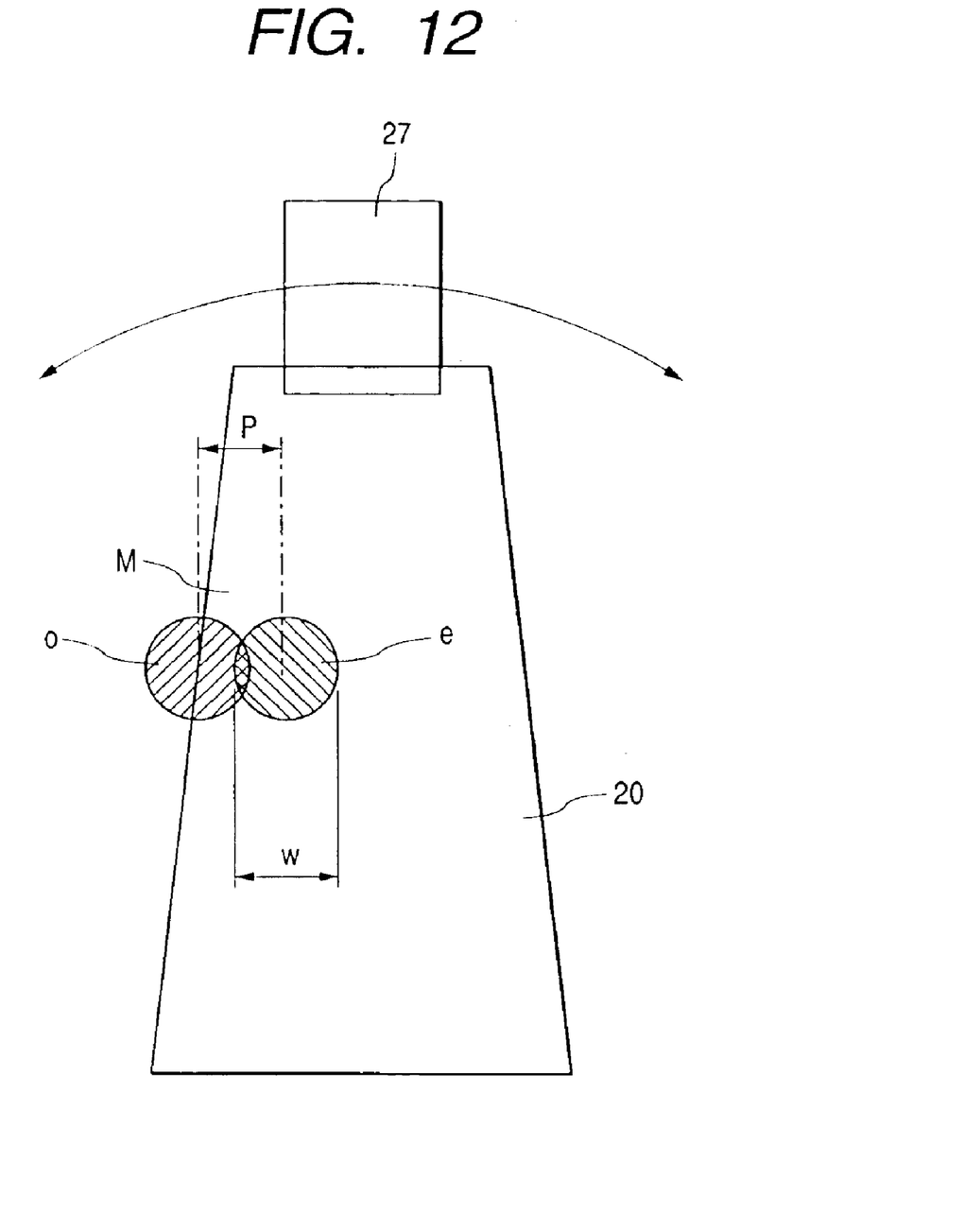
FIG. 12 is an explanatory view of an illumination light beam by an optical displacement detection apparatus.

FIG. 12 is an explanatory view of still another embodiment. In this embodiment, not a marking M but the boundary portion (end portion) of the metal reflecting object of a head arm 20 is used.

As shown in FIG. 11, when the boundary portion passes through the region illuminated with two light beams by relative movement, the reflected light amounts are modulated at different timings.

The two reflected light beams from the reflecting object are transmitted through a crystal plate 15. The principal rays of the two light beams match again, are returned to a non-polarization beam splitter 13, and split into transmitted light and reflected light by a polarizing prism 16. As in the above embodiment, an ordinary light beam (o) and extraordinary light beam (e) become incident on light receiving elements 17 and 18, respectively.

Figure 13:
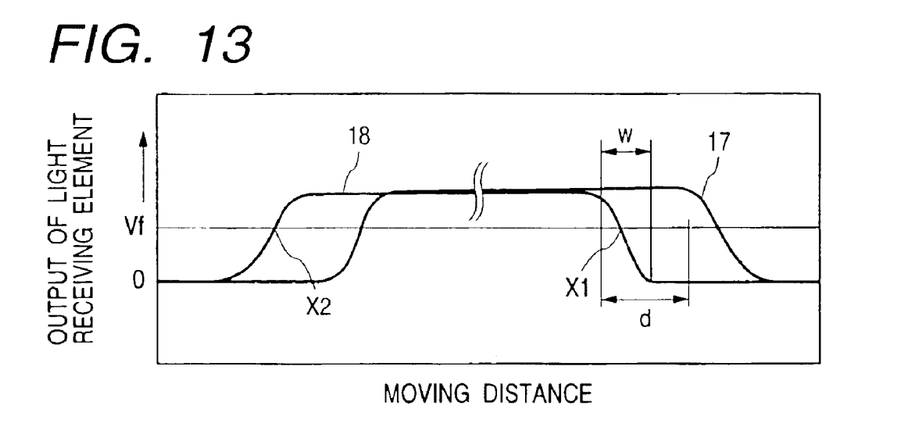
FIG. 13 is a graph for explaining the output signal waveforms of the optical displacement detection apparatus.

FIG. 13 is a graph showing changes in reflected light amounts from two focusing regions, i.e., incident light amounts onto the light receiving elements 17 and 18 when the boundary portion (end portion) of the metal reflecting object of the head arm 20 is illuminated. The displacement is detected on the basis of changes in signal levels of the light receiving elements 17 and 18. Basically, the signal of one light receiving element 18 is detected. When a predetermined reference level Vf is defined as a reference position, and the boundary portion of the reflecting object relatively shifts to the left or right, the signal level rises or drops. The signal from the light receiving element 17 is used for discrimination of the other of the two boundary portions of the reflecting object.

At a cross point X1 between the reference level Vf and the light receiving element 18, the incident light amount onto the light receiving element 17 is minimum. When the boundary portion moves by a focusing light beam width w, the signal level changes from the maximum value to the minimum value. For example, when the focusing light width w is set at 5 μm, and the signal level is divided into 4,096 steps using an A/D converter, a resolving power of about 1.25 nm can be obtained. When not the whole signal level but only the signal level of 10% near the zero-cross point is divided into 4,096 steps by the A/D converter, a resolving power about 10 times higher (0.125 nm) can be obtained.

Figure 14:
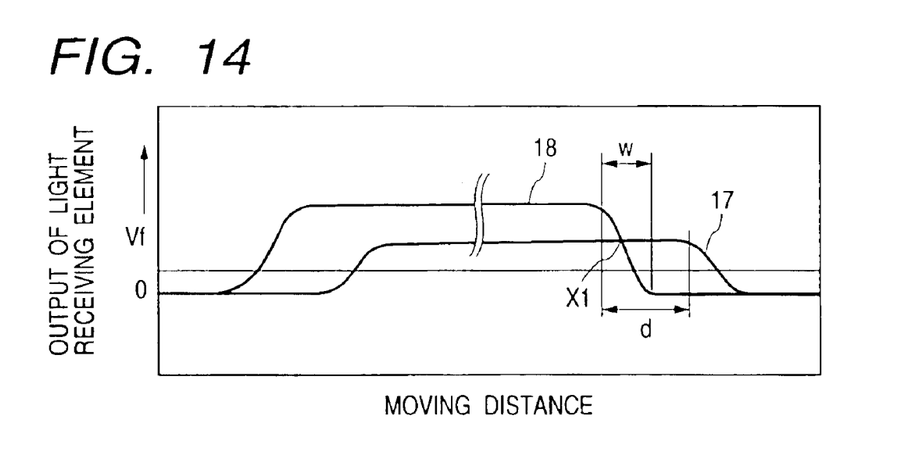
FIG. 14 is a graph for explaining the output signal waveforms of the optical displacement detection apparatus.
Figure 15:
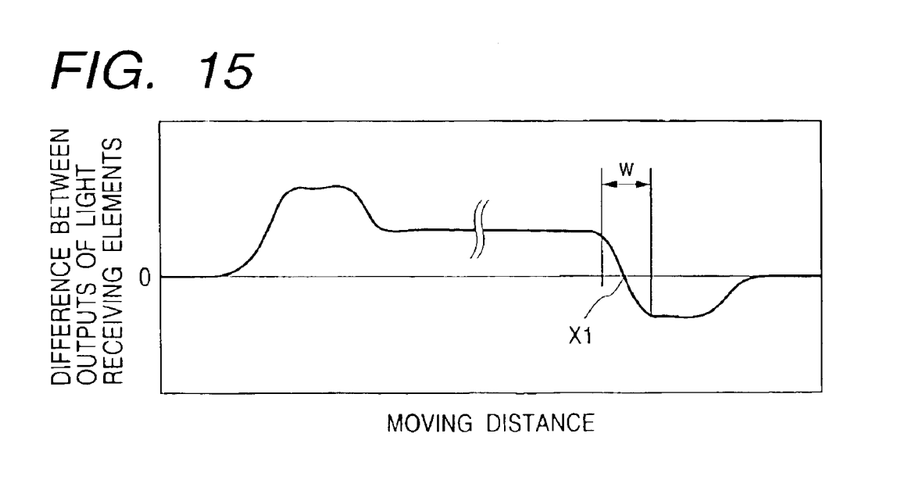
FIG. 15 is a graph for explaining the difference signal between the output signal waveforms of the optical displacement detection apparatus.

As shown in FIG. 15, the difference between the light receiving amounts obtained by signals of the light receiving elements 17 and 18 as shown in FIG. 14 may be obtained, and the zero-cross position of the difference signal between the light receiving elements 17 and 18 may be defined as the reference position X1. This can be implemented by intentionally unbalancing the amounts of the two light beams with which the object is illuminated or adding a filter immediately before the light receiving elements 17 and 18. The two light beams with which the object is illuminated have polarization planes that are perpendicular to each other. For that reason, an angle η made by the plane of polarization of a laser diode 11 and a vector obtained by projecting the optical axis in the crystal plate 15 onto the incident surface may be shifted from 45°.

The incidence ratio between the ordinary light beam (o) and the extraordinary light beam (e) which become incident on the light receiving elements 17 and 18, respectively, is cos η: sin η. When the angle η is set to about 27°, the ratio can be 2:1.

In addition, a polarizing plate or polarizing filter may be added immediately before the light receiving element 17.

Referring to FIG. 15, the zero-cross signal of the difference signal between the light receiving element 18 for receiving the extraordinary light beam e and the light receiving element 17 for receiving the ordinary light beam o directly corresponds to the reference position X1.

There are two more zero positions of the difference signal. When both of the two light beams deviate from the two boundary portions of the head arm 20, the reflected light amounts of both the light receiving elements 17 and 18 are zero. In order not to detect this state, determination means for determining whether the signal level of the light receiving element 17 exceeds the reference level Vf in FIG. 14 is added.

The reference position X1 is detected when the signal level of the light receiving element 17 exceeds the reference level Vf and the difference signal is zero.

Figure 16:
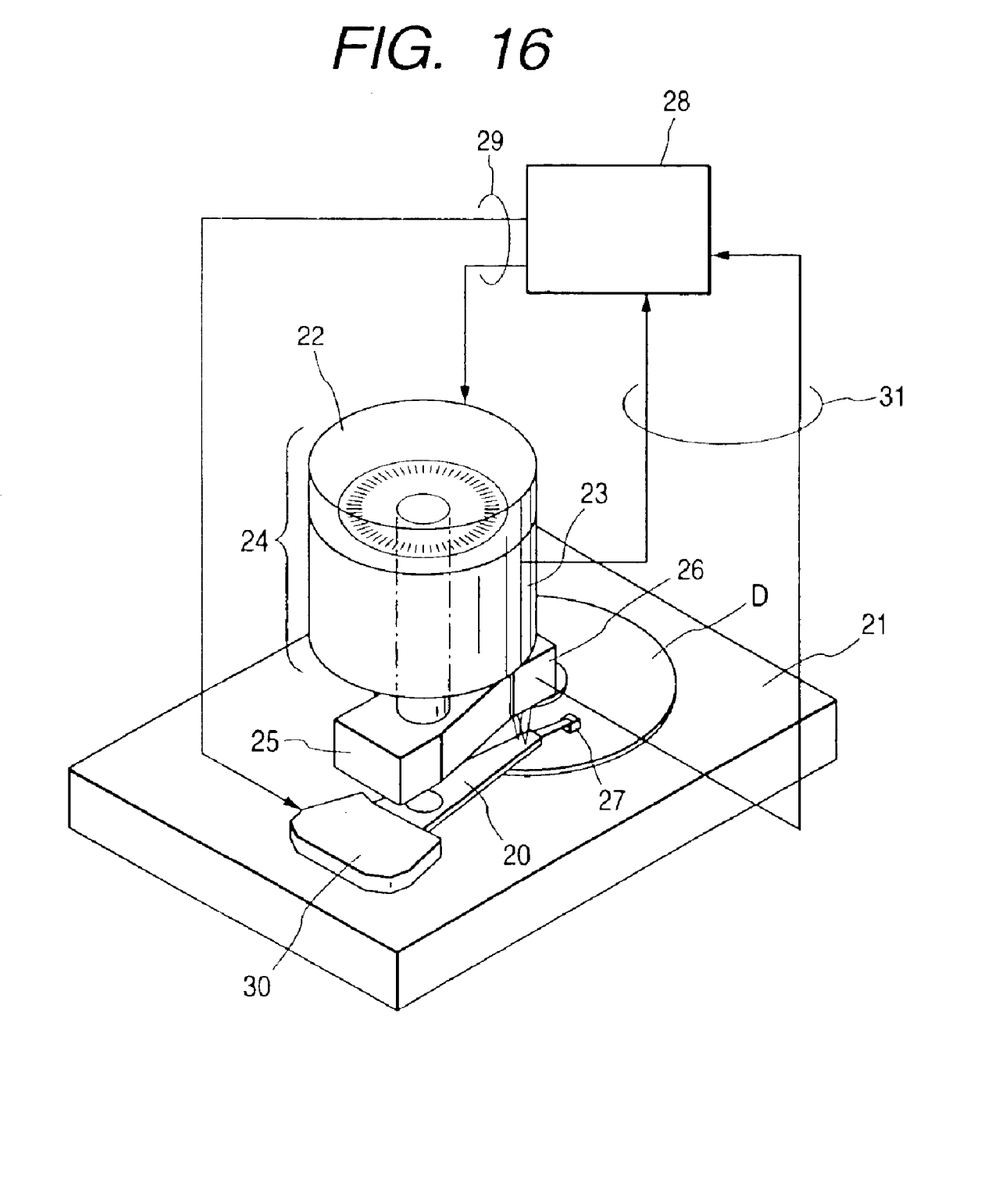
FIG. 16 is a view showing the arrangement of a hard disk drive servo track pattern writing apparatus using the optical displacement detection apparatus.

FIG. 16 is a view showing an embodiment in which the optical displacement detection apparatus of the above embodiment is applied to an HDD servo track pattern recording apparatus.

FIG. 16 is different from FIG. 7 of the above embodiment in that a head arm 20 has no marking M but the boundary portion of a metal reflecting object.

The process of writing a servo track signal in the hard disk of the HDD in this embodiment is the same as in (1) to (3) described above. However, although the marking M is used in the above embodiment, the boundary portion with a different reflectance is used in this embodiment.

This also applies to the modifications (i) to (v) described above.

As has been described above, the optical displacement detection apparatus and the magnetic recording apparatus using the displacement detection apparatus of the present invention are more advantageous in the following points than the conventional scheme.

(a) A marking can be formed on the upper surface of the head arm simply by a process of forming a scribe line. A boundary portion can be formed simply by providing a metal element having a different reflectance. Alternatively, instead of forming a marking, the metal element to be detected itself can be used. The arrangement is very simple and easy.

(b) Since the signal level is increased or reduced by a displacement, a pulse counter as in the prior art using a laser interferometric measuring machine can be omitted, and signal processing is easy. Especially, since the direction of displacement can be determined on the basis of whether the signal level rises or drops, signal processing is easy.

(c) Since a point near the zero level of the signal difference from two points that are separated by a small distance is used as a reference, variation in reflectance of the head arm rarely has any influence, and the processing is stable. In addition, since a variation in scribe line state or a fluctuation in illumination light beam rarely affects the difference signal, the signal can be stably detected.

(d) The vertical vibration of the head arm due to surface vibration in rotating the hard disk basically has no influence.

(e) Since the marking or boundary portion on the head arm can be easily formed near the magnetic head, a displacement can be detected at a high resolving power.

(f) Since the number of components of the optical system is small, the apparatus can be made compact and lightweight.

What is claimed is:

1. A displacement detection apparatus comprising:
a light beam illuminating system that converts a linearly polarized light beam emitted from a light emitting element into a substantially parallel light beam;
a light beam splitting optical system that splits the parallel light beam emerging from said light beam illuminating system into a plurality of polarized light beams having different polarized states;
a focusing optical system that focuses the plurality of split light beams to different positions which are spatially separated from one another on a surface of a relatively moving object;
a polarizing prism that splits reflected light beams from the relatively moving object on the basis of a difference between the plurality of directions of polarization, wherein said reflected light beams are matched by said light beam splitting optical system;
a plurality of light receiving optical systems that individually detect the different polarized light beams split by said polarizing prism and output light receiving signals of the respective light beams; and
a comparator that compares light receiving signal levels of the respective light beams to detect a relative displacement of the relatively moving object.

2. An apparatus according to claim 1, wherein said light beam splitting optical system has an optical performance capable of splitting the light beam emerging from said light emitting element and, at positions where the light beams are focused by said focusing optical system, spatially separating the focusing positions of the focused light beams.

3. An apparatus according to claim 2, wherein the surface of the relatively moving object is substantially vertically irradiated with the plurality of focused light beams.

4. An apparatus according to claim 1, wherein a slit-shaped marking or a three-dimensional marking is formed on the surface of the relatively moving object to generate a reflectance difference.

5. An apparatus according to claim 4, wherein said light beam splitting optical system has an optical characteristic with which the focusing positions of the plurality of focused light beams are spatially separated at an interval almost equal to a width of the marking.

6. An apparatus according to claim 1, wherein said light beam splitting optical system has a parallel plate shape.

7. An apparatus according to claim 1, wherein said light beam splitting optical system is a crystal optical element.

8. An apparatus according to claim 1, wherein a boundary portion is formed on the surface of the relatively moving object to generate a reflectance difference.

9. A magnetic recording apparatus comprising:
a displacement detection apparatus comprising:
a light beam illuminating system that converts a linearly polarized light beam emitted from a light emitting element into a substantially parallel light beam;
a light beam splitting optical system that splits the single parallel light beam emerging from said light beam illuminating system into a plurality of polarized light beams having different polarized states;
a focusing optical system that focuses the plurality of split light beams to different positions which are spatially separated from one another on a surface of a relatively moving object;
a polarizing prism that splits reflected light beams from the relatively moving object on the basis of a difference between the plurality of directions of polarization, wherein said reflected light beams are matched by said light beam splitting optical system;
a plurality of light receiving optical systems that individually detect the different polarized light beams split by said polarizing prism and output light receiving signals of the respective light beams; and
a comparator that compares light receiving signal levels of the respective light beams to detect a relative displacement of the relatively moving object, wherein a slit-shaped marking or a three-dimensional marking is formed on the surface of the relatively moving object to generate a reflectance difference;

a head arm having the marking or reflectance boundary portion formed on an upper surface;

a rotary positioner having said displacement detection apparatus on a rotary arm; and a head arm drive motor control unit that controls a current of a head arm drive motor of a hard disk drive to synchronize a motion of said rotary positioner with a motion of said head arm so that an output from said displacement detection apparatus becomes constant as a position of said rotary positioner varies.

10. A rotary encoder comprising:

a displacement detection apparatus comprising:

a light beam illuminating system that converts a linearly polarized light beam emitted from a light emitting element into a substantially parallel light beam;

a light beam splitting optical system that splits the single parallel light beam emerging from said light beam illuminating system into a plurality of polarized light beams having different polarized states;

a focusing optical system that focuses the plurality of split light beams to different positions which are spatially separated from one another on a surface of a relatively moving object;

a polarizing prism that splits reflected light beams from the relatively moving object on the basis of a difference between the plurality of directions of polarization, wherein said reflected light beams are matched by said light beam splitting optical system;

a plurality of light receiving optical systems that individually detect the different polarized light beams split by said polarizing prism and output light receiving signals of the respective light beams; and a comparator that compare light receiving signal levels of the respective light beams to detect a relative displacement of the relatively moving object, wherein a slit-shaped marking or a three-dimensional marking is formed on the surface of the relatively moving object to generate a reflectance difference;

wherein the slit-shaped marking or reflectance boundary portion is formed on a rotary disk surface; and wherein said displacement detection apparatus is provided on a fixed object side to receive the plurality of reflected light beams from the marking or reflectance boundary portion on a moving scale and to detect a scale origin from a difference signal between the plurality of light receiving signals.

11. A linear encoder comprising:

a displacement detection apparatus of comprising:

a light beam illuminating system that converts a linearly polarized light beam emitted from a light emitting element into a substantially parallel light beam;

a light beam splitting optical system that splits the single parallel light beam emerging from said light beam illuminating system into a plurality of polarized light beams having different polarized states;

a focusing optical system that focuses the plurality of split light beams to different positions which are spatially separated from one another on a surface of a relatively moving object;

a polarizing prism that splits reflected light beams from the relatively moving object on the basis of a difference between the plurality of directions of polarization, wherein said reflected light beams are matched by said light beam splitting optical system;

a plurality of light receiving optical systems that individually detect the different polarized light beams split by said polarizing prism and output light receiving signals of the respective light beams; and a comparator that compares light receiving signal levels of the respective light beams to detect a relative displacement of the relatively moving object, wherein a slit-shaped marking or a three-dimensional marking is formed on the surface of the relatively moving object to generate a reflectance difference;

wherein the slit-shaped marking or reflectance boundary portion is formed on a linear encoder scale surface, and wherein said displacement detection apparatus is provided on a moving object side to receive the plurality of reflected light beams from the marking or reflectance boundary portion on the linear encoder scale and to detect a scale origin from a difference signal between the plurality of light receiving signals.

12. A magnetic recording apparatus comprising:

a displacement detection apparatus comprising:

a light beam illuminating system that comvers a linearly polarized light beam emitted from a light emitting element into a substantially parallel light beam;

a light beam splitting optical system that splits the single parallel light beam emerging from said light beam illuminating system into a plurality of polarized light beams having different polarized states;

a focusing optical system that focuses the plurality of split light beams to different positions which are spatially separated from one another on a surface of a relatively moving object;

a polarizing prism that splits reflected light beams from the relatively moving object on the basis of a difference between the plurality of directions of polarization, wherein said reflected light beams are matched by said light beam splitting optical system;

a plurality of light receiving optical systems that individually detect the different polarized light beams split by said polarizing prism and output light receiving signals of the respective light beams; and a comparator that compare light receiving signal levels of the respective light beams to detect a relative displacement of the relatively moving object, wherein a boundary portion is formed on the surface of the relatively moving object to generate a reflectance difference;

a head arm having the marking or reflectance boundary portion formed on an upper surface;

a rotary positioner having said displacement detection apparatus on a rotary arm; and a head arm drive motor control unit that controls a current of a head arm drive motor of a hard disk drive to synchronize a motion of said rotary positioner with a motion of said head arm so that an output from said displacement detection apparatus becomes constant as a position of said rotary positioner varies.

13. A rotary encoder comprising:

a displacement detection apparatus comprising:

a light beam illuminating system that converts a linearly polarized light beam emitted from a light emitting element into a substantially parallel light beam;

a light beam splitting optical system that splits the single parallel light beam emerging from said light beam illuminating system into a plurality of polarized light beams having different polarized states;

a focusing optical system that focuses the plurality of split light beams to different positions which are spatially separated from one another on a surface of a relatively moving object;

a polarizing prism that splits reflected light beams from the relatively moving object on the basis of a difference between the plurality of directions of polarization, wherein said reflected light beams are matched by said light beam splitting optical system;

a plurality of light receiving optical systems that individually detect the different polarized light beams split by said polarizing prism and output light receiving signals of the respective light beams; and a comparator that compares light receiving signal levels of the respective light beams to detect a relative displacement of the relatively moving object, wherein a boundary portion is formed on the surface of the relatively moving object to generate a reflectance difference;

wherein a slit-shaped marking or reflectance boundary portion is formed on a rotary disk surface, and wherein said displacement detection apparatus is provided on a fixed object side to receive the plurality of reflected light beams from the marking or reflectance boundary portion on a moving scale and to detect a scale origin from a difference signal between the plurality of light receiving signals.

14. A linear encoder comprising:

a displacement detection apparatus comprising:

a light beam illuminating system that converts a linearly polarized light beam emitted from a light emitting element into a substantially parallel light beam;

a light beam splitting optical system that splits the single parallel light beam emerging from said light beam illuminating system into a plurality of polarized light beams having different polarized states;

a focusing optical system that focuses the plurality of split light beams to different positions which are spatially separated from one another on a surface of a relatively moving object;

a polarizing prism that splits reflected light beams from the relatively moving object on the basis of a difference between the plurality of directions of polarization, wherein said reflected light beams are matched by said light beam splitting optical system;

a plurality of light receiving optical systems that individually detect the different polarized light beams split by said polarizing prism and output light receiving signals of the respective light beams; and a comparator that compares light receiving signal levels of the respective light beams to detect a relative displacement of the relatively moving object, wherein a boundary portion is formed on the surface of the relatively moving object to generate a reflectance difference;

wherein a slit-shaped marking or reflectance boundary portion is formed on a linear encoder scale surface, and wherein said displacement detection apparatus is provided on a moving object side to receive the plurality of reflected light beams from the marking or reflectance boundary portion on the linear encoder scale and to detect a scale origin from a difference signal between the plurality of light receiving signals.

15. A displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter.

16. A displacement detection apparatus according to claim 15, wherein the illuminating system includes a light emitting element which emits a linearly polarized light beam, and an optical element which converts a light beam into a substantially parallel light beam.

17. A displacement detection apparatus according to claim 15, wherein the optical system includes a quartz plate which splits the parallel light beam from said illuminating system into a plurality of polarized light beams.

18. A displacement detection apparatus according to claim 15, further comprising a plurality of light receiving optical systems that individually detect the different polarized light beams split by said polarizing splitter and that output signals corresponding to the respective light beams; and a comparator that compares said signals to detect a relative displacement of the relatively moving object.

19. A displacement detection apparatus according to claim 15, wherein the polarizing beam splitter is polarizing prism.

20. A displacement detection apparatus according to claim 15, wherein the polarizing beam splitter is a plurality of polarizing plates each of which having a polarizing direction different from the others.

21. A magnetic recording apparatus comprising:

a displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a slit-shaped marking or a three-dimensional marking is formed on the surface of the relatively moving object to generate a reflectance difference;

a head arm having the marking or reflectance boundary portion formed on an upper surface;

a rotary positioner having said displacement detection apparatus provided on a rotary arm; and a head arm drive motor control unit that controls a current of a head arm drive motor of a hard disk drive to synchronize a motion of said rotary positioner with a motion of said head arm so that an output from said displacement detection apparatus becomes constant as a position of said rotary positioner varies.

22. A rotary encoder comprising:

a displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a slit-shaped marking or a three-dimensional marking is formed on the surface of the relatively moving object to generate a reflectance difference;

wherein the slit-shaped marking or reflectance boundary portion is formed on a rotary disk surface; and wherein said displacement detection apparatus is provided on a fixed object side to receive the plurality of reflected light beams from the marking or reflectance boundary portion on a moving scale and to detect a scale origin from a difference signal between the plurality of light receiving signals.

23. A linear encoder comprising:

a displacement detection apparatus of comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a slit-shaped marking or a three-dimensional marking is formed on the surface of the relatively moving object to generate a reflectance difference;

wherein the slit-shaped marking or reflectance boundary portion is formed on a linear encoder scale surface, and wherein said displacement detection apparatus is provided on a moving object side to receive the plurality of reflected light beams from the marking or reflectance boundary portion on the linear encoder scale and to detect a scale origin from a difference signal between the plurality of light receiving signals.

24. A magnetic recording apparatus comprising:

a displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a boundary portion is formed on the surface of the relatively moving object to generate a reflectance difference;

a head arm having the marking or reflectance boundary portion formed on an upper surface;

a rotary positioner having said displacement detection apparatus provided on a rotary arm; and a head arm drive motor control unit that controls a current of a head arm drive motor of a hard disk drive to synchronize a motion of said rotary positioner with a motion of said head arm so that an output from said displacement detection apparatus becomes constant as a position of said rotary positioner varies.

25. A rotary encoder comprising:

a displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a boundary portion is formed on the surface of the relatively moving object to generate a reflectance difference;

wherein a slit-shaped marking or reflectance boundary portion is formed on a rotary disk surface, and wherein said displacement detection apparatus is provided on a fixed object side to receive the plurality of reflected light beams from the marking or reflectance boundary portion on a moving scale and to detect a scale origin from a difference signal between the plurality of light receiving signals.

26. A linear encoder comprising:

a displacement detection apparatus comprising:

an illuminating system that emits a light beam;

an optical system that splits the emitted light beam from said illuminating system into a plurality of polarized light beams having different polarized states and being focused on different positions on a surface of a relatively moving object, and that superposes the polarized light beams reflected from said surface of the relatively moving object;

a polarizing beam splitter that splits the superposed light beams into a plurality of light beams based on a difference of the polarization direction in relation to said different polarized states; and, a displacement detection circuit that detects a relative displacement of the relatively moving object based on the light beams split by the polarizing beam splitter, wherein a boundary portion is formed on the surface of the relatively moving object to generate a reflectance difference;

wherein a slit-shaped marking or reflectance boundary portion is formed on a linear encoder scale surface, and wherein said displacement detection apparatus is provided on a moving object side to receive the plurality of reflected light beams from the marking or reflectance boundary portion on the linear encoder scale and to detect a scale origin from a difference signal between the plurality of light receiving signals.

* * * * *

UNITED STATES PATENT AND TRADEMARK OFFICE
CERTIFICATE OF CORRECTION

PATENT NO. : 7,054,095 B2 Page 1 of 1
APPLICATION NO. : 09/840116
DATED : May 30, 2006
INVENTOR(S) : Ko Ishizuka It is certified that error appears in the above-identified patent and that said Letters Patent is hereby corrected as shown below:

COLUMN 9

Line 37, "compare" should read --compares--; and
      Line 53, "of" should be deleted--.

COLUMN 10

Line 25, "convers" should read --converts--; and
      Line 46, "compare" should read --compares--.

Signed and Sealed this

Twelfth Day of December, 2006

JON W. DUDAS
*Director of the United States Patent and Trademark Office*